(12) United States Patent

Bisaillon et al.

(10) Patent No.: US 12,677,732 B2

(45) Date of Patent: Jul. 14, 2026

(54) TRACTOR-ASSISTED MULTI-ROW HARVESTER FOR ROOT VEGETABLES

(71) Applicant: UNIVERCO (1978) INC., Napierville (CA)

(72) Inventors: Carl Bisaillon, Napierville (CA); Serge L'Heureux, Napierville (CA)

(73) Assignee: UNIVERCO (1978) INC., Napierville (CA)

( * ) Notice: Subject to any disclaimer, the term of this patent is extended or adjusted under 35 U.S.C. 154(b) by 1015 days.

(21) Appl. No.: 17/632,663

(22) PCT Filed: Jul. 30, 2020

(86) PCT No.: PCT/CA2020/000096

§ 371 (c)(1),
(2) Date: Feb. 3, 2022

(87) PCT Pub. No.: WO2021/022356

PCT Pub. Date: Feb. 11, 2021

(65) Prior Publication Data

US 2022/0279709 A1 Sep. 8, 2022

Related U.S. Application Data

(60) Provisional application No. 62/883,920, filed on Aug. 7, 2019.

(51) Int. Cl.
*A01D 33/12* (2006.01)
*A01D 25/02* (2006.01)
*A01D 33/14* (2006.01)

(52) U.S. Cl.
CPC ............. *A01D 33/12* (2013.01); *A01D 25/02* (2013.01); *A01D 33/14* (2013.01)

(58) Field of Classification Search
CPC ........ A01D 25/00; A01D 25/02; A01D 25/04; A01D 33/12; A01D 33/14; A01B 67/00
See application file for complete search history.

(56) References Cited

U.S. PATENT DOCUMENTS 2,589,361 A * 3/1952 Waack et al. .......... A01D 23/04
171/34
3,435,900 A * 4/1969 Weichel ................. A01D 90/00
56/364

(Continued)

FOREIGN PATENT DOCUMENTS

CN 109479490 A 3/2019
EP 20849851.9 10/2023
WO WO 7/2020
PCT/CA2020/000096

*Primary Examiner* — Christopher J Sebesta
*Assistant Examiner* — Joel F. Mitchell
(74) *Attorney, Agent, or Firm* — Agence de Brevets Fournier

(57) ABSTRACT

A tractor-assisted multi-row harvester for root vegetables includes adjacent pairs of a lifting share and a picker and a pair of traction assemblies, for example in the form of endless track assemblies, one of which being behind and registered with at least one of the adjacent pairs of a lifting share and picker and being motorized and energized so as to compensate at least partially for pressure on the lifting shares. The harvester includes sensors on the motorized traction assembly and/or on the lifting shares that generates signal(s) indicative of the pressure on the lifting shares and that is used to control the motorized traction assembly to compensate for the pressure.

10 Claims, 4 Drawing Sheets

(56) References Cited

U.S. PATENT DOCUMENTS

| | | | | |
|---|---|---|---|---|
| 3,473,614 A * | 10/1969 | Kemp | A01D 23/04 | 171/61 |
| 3,638,406 A * | 2/1972 | Scherer et al. | A01D 43/088 | 56/2 |
| 3,809,164 A * | 5/1974 | Hook et al. | A01D 33/10 | 171/58 |
| 4,122,901 A * | 10/1978 | Koepplin | A01D 25/048 | 305/195 |
| 4,173,257 A * | 11/1979 | Mortensen et al. | A01D 31/00 | 171/33 |
| 4,185,696 A * | 1/1980 | Williams et al. | A01D 33/14 | 171/110 |
| 4,629,005 A * | 12/1986 | Hood et al. | A01D 31/00 | 171/25 |
| 5,207,277 A * | 5/1993 | Medlock | A01D 25/048 | 171/36 |
| 7,044,257 B2 * | 5/2006 | Kempf et al. | F16H 61/472 | 180/308 |
| 7,284,620 B1 * | 10/2007 | Dover | B60D 1/483 | 172/248 |
| 8,549,828 B2 * | 10/2013 | Burger | A01D 43/006 | 172/7 |
| 9,357,709 B2 * | 6/2016 | Waechter et al. | A01B 69/007 | |
| 9,702,458 B2 * | 7/2017 | Storer et al. | B60K 17/356 | |
| 9,781,873 B2 * | 10/2017 | Prickel et al. | A01B 73/065 | |
| 2019/0246548 A1 * | 8/2019 | Kovach et al. | A01B 3/24 | |

* cited by examiner

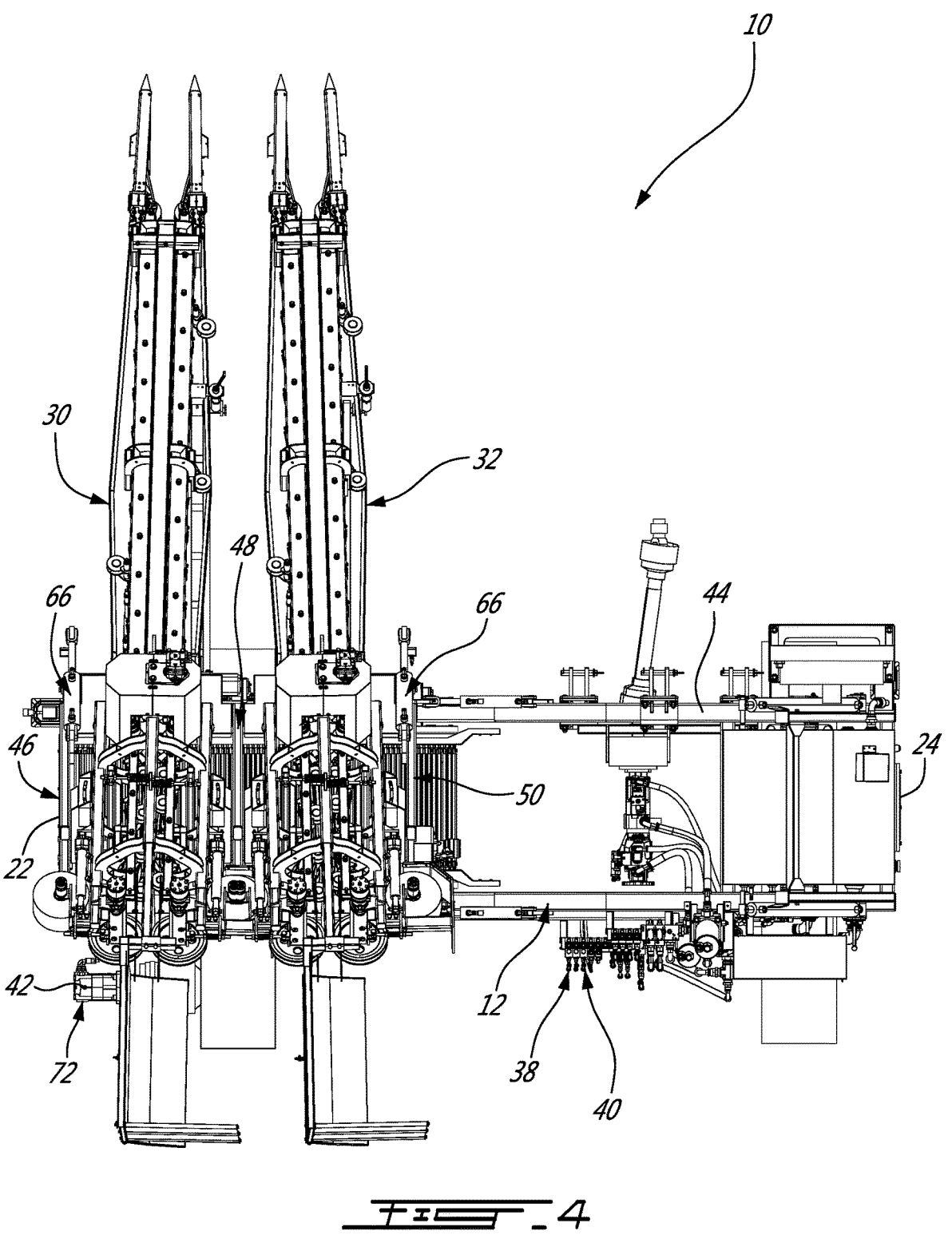
_FIG_.4

TRACTOR-ASSISTED MULTI-ROW HARVESTER FOR ROOT VEGETABLES

FOREIGN PRIORITY CLAIM

This is a 35 U.S.C. § 371 application of, and claims priority to, International Application No. PCT/CA2020/000096, which was filed on Jul. 30, 2020, and published as Publication No. WO 2021/022356, which claims priority to U.S. Provisional Patent Application No. 62/883,920, which was filed on Aug. 7, 2019, the entirety of all the applications are incorporated herein by reference.

FIELD

The present invention generally relates to harvesters and more specifically to a tractor-assisted multi-row harvester for carrots or the likes.

BACKGROUND

Harvesters for root vegetables such as carrots are well-known in the art. They include one or more pairs of lifting shares and pickers, both tools working together in each pair to consecutively harvest root vegetables in a row. More specifically, the picker grabs each vegetable by its green top and the lifting share get the vegetable out of the ground.

Harvesters for root vegetables are either self-propelled or tractor-assisted, wherein the self-propelled are more costly but allows multi-row harvesting. As such, they are commonly used for large scale harvesting.

A drawback of current tractor-assisted harvesters for root vegetables is that they are limited to being single-row. Indeed, by its function, the lifting share creates friction on the ground, which causes the tractor to be pulled sideway when there is more than one lifting share, causing the harvester to quit its row.

While it is usually profitable to buy and use a self-propelled harvester for root vegetables in the case of a plurality rows of vegetables, there is a need for a tractor-assisted multi-row harvester for root vegetables for a low number of rows.

SUMMARY

The problem of pressure on the lifting share of tractor-assisted harvester for root-vegetable, which limit to one the number of harvested row, is solved by providing a traction assembly that is registered with the lifting shares and which compensate for the pressure thereon.

According to an illustrative embodiment, there is provided a tractor-assisted multi-row harvester for root vegetables comprising:

adjacent pairs of a lifting share and a picker; and
   first and second traction assemblies; the first traction assembly being behind and registered with at least one of the adjacent pairs of a lifting share and a picker and being motorized and energized so as to compensate at least partially for pressure on the lifting shares.

According to another embodiment, there is provided a tractor-assisted multi-row harvester for root vegetables comprising:

a frame having a height and first and second lateral sides defining a width of the frame; the frame further defining a first axis along its width and a second axis along its height; the second axis being perpendicular to the first axis;

first and second parallel traction assemblies that are mounted to the frame thereunder for supporting the frame so as to be both operatively oriented perpendicular to both the first and second axes; the first and second traction assemblies being registered with respectively first and second positions along the first axis near the first and second lateral sides of the frame respectively; the first traction assembly being motorized;
   a three-point hitch mounting assembly secured to the frame for operatively attaching the multi-row harvester to a tractor;
   a plurality of generally parallel pickers that are pivotally mounted to the frame on a first lateral side of the three-point hitch mounting assembly along the first axis so that at least one of the plurality of generally parallel pickers is at least partially registered with the first traction assembly; the plurality of generally parallel pickers being slanted relative to the second axis;
   a plurality of lifting shares mounted to the frame, each under and behind a respective one of the plurality of pickers for solidary pivotal movement therewith; and
   at least one sensor mounted to the frame and coupled to the first traction assembly for generating at least one signal indicative of a pressure on the first and second lifting shares;
   the first traction assembly being energized according to the at least one signal so as to match the pressure on the plurality of lifting shares.

According to a further illustrative embodiment, there is provided a tractor-assisted two-row harvester for root vegetables comprising:

a frame having a height and first and second lateral sides defining a width of the frame; the frame further defining a first axis along its width and a second axis along its height; the second axis being perpendicular to the first axis;
   first and second parallel traction assemblies that are mounted to the frame thereunder for supporting the frame so as to be both operatively oriented perpendicular to both the first and second axes; the first and second traction assemblies being registered with respectively first and second positions along the first axis near the first and second lateral sides of the frame respectively; the first traction assembly being motorized;
   a three-point hitch mounting assembly secured to the frame for operatively attaching the two-row harvester to a tractor;
   first and second generally parallel pickers that are pivotally mounted to the frame on a first lateral side of the three-point hitch mounting assembly along the first axis so that each is on a respective lateral side of the first traction assembly; the first and second pickers being slanted relative to the second axis;
   first and second lifting shares mounted to the frame, each under and behind a respective one of the first and second pickers for solidary pivotal movement therewith; and
   at least one sensor mounted to the frame and coupled to the first traction assembly for generating at least one signal indicative of a pressure on the first and second lifting shares;
   the first traction assembly being energized according to the at least one signal to match the pressure on the first and second lifting shares.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale

BRIEF DESCRIPTION OF THE DRAWINGS

In the appended drawings:

FIG. 4 is a top plan view of the harvester from FIG. 1.

DETAILED DESCRIPTION

Figure 1:
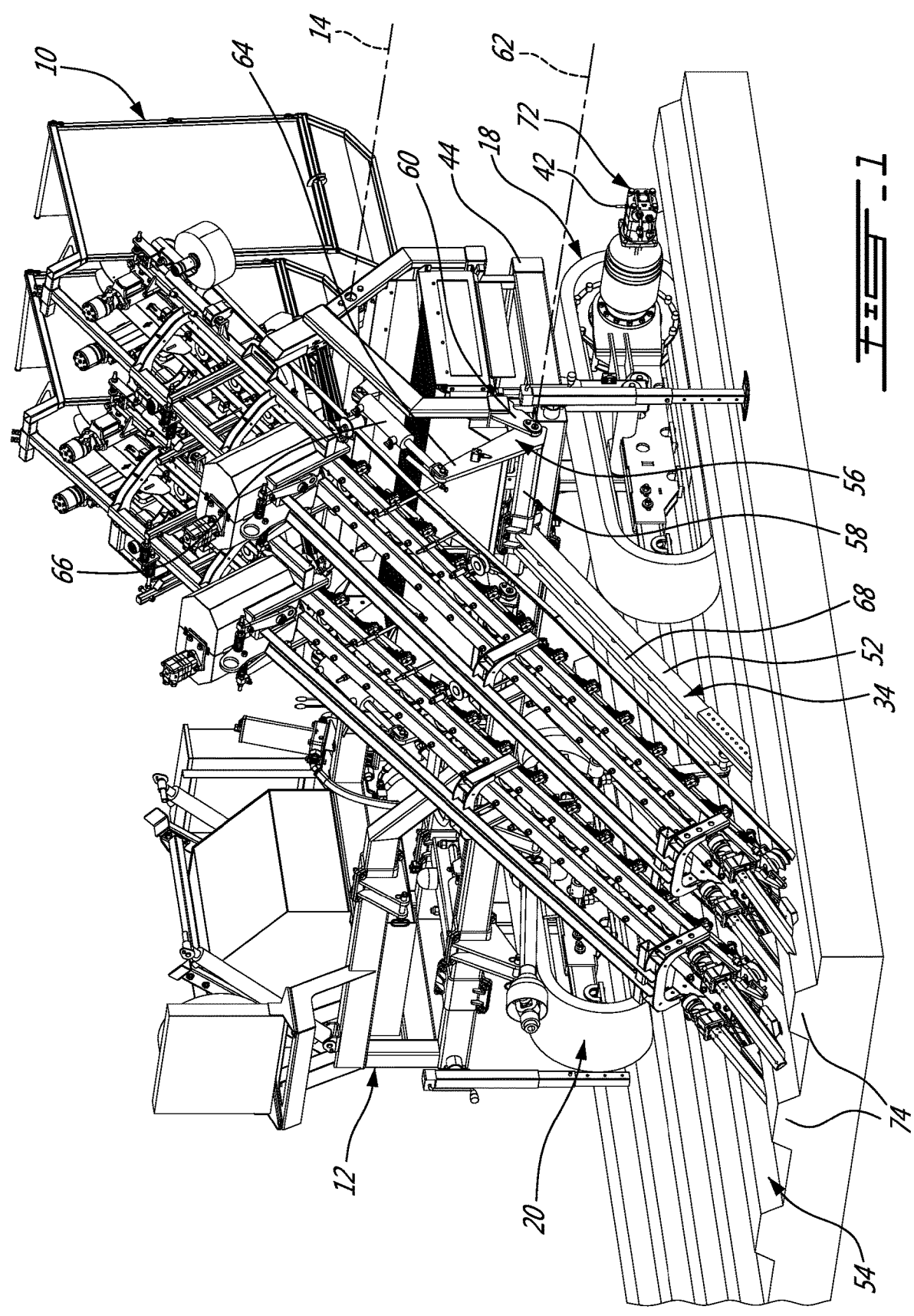
FIG. 1 is a first side front perspective of a tractor-assisted two-row harvester for root vegetables according to an illustrative embodiment; the harvester being shown in a carrot field.
Figure 2:
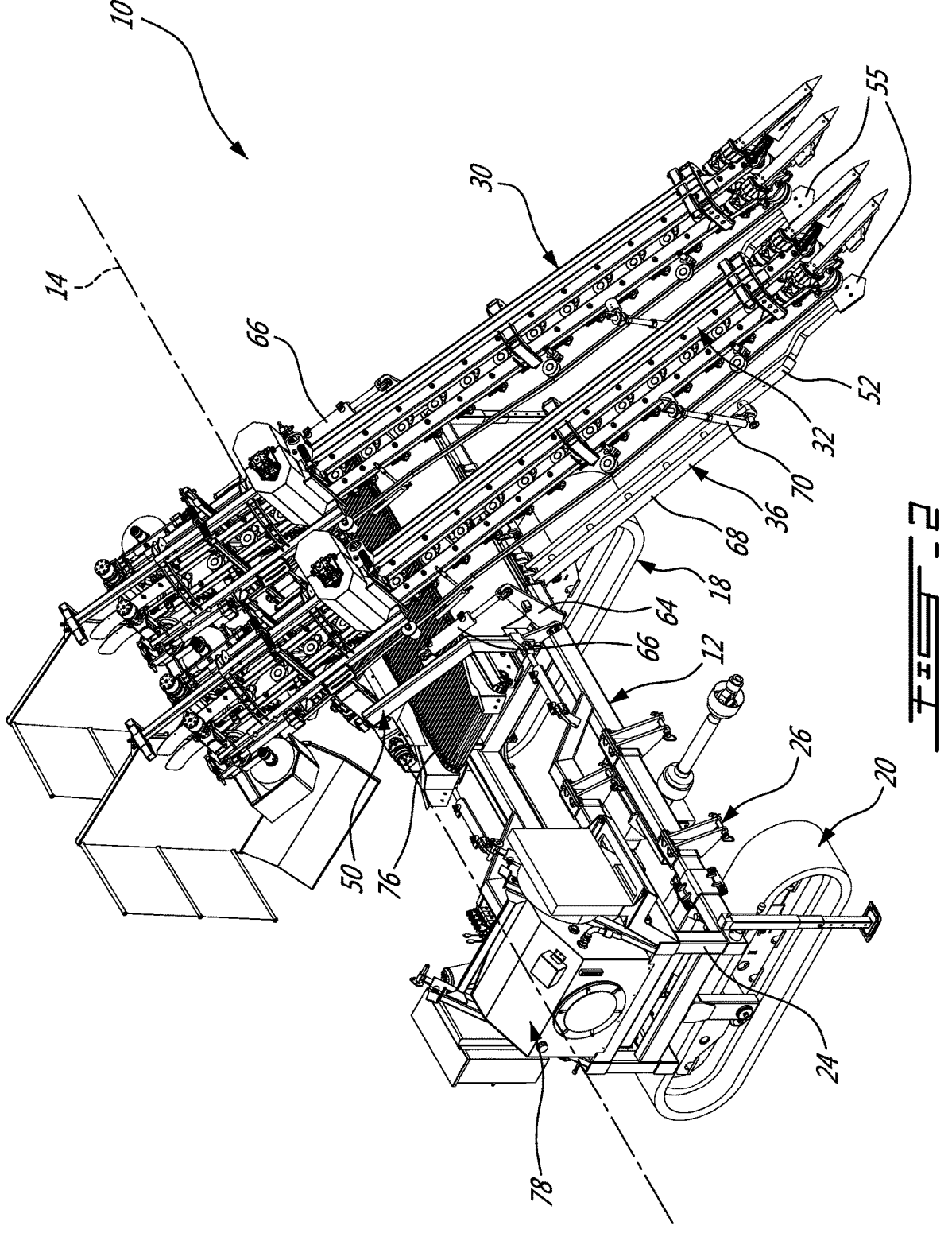
FIG. 2 is a second side front perspective of the harvester from FIG. 1.

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

An illustrated embodiment of a tractor-assisted two-row harvester for carrots 10 will now be described with reference to FIGS. 1 to 4.

The two-row harvester 10 comprises:

a frame 12 that defines a first axis 14 along its width and a second axis 16 along its height, that is perpendicular to the first axis 14;

first and second parallel traction assemblies in the form of endless track assemblies 18-20 that are mounted to the frame 12 thereunder so as to be both operatively oriented perpendicular to both the first and second axes 14 and 16; the first and second track assemblies 18-20 being registered with respectively first and second positions along the first axis 14 near first and second lateral sides 22 and 24 of the frame 12 respectively; the first track 18 being motorized;

a three-point hitch mounting assembly 26 secured to the frame 12 for operatively attaching the two-row harvester 10 to a conventional tractor 28;

first and second generally parallel pickers 30 and 32 that are pivotally mounted to the frame 12 on a first lateral side of the three-point hitch mounting assembly 26 along the first axis 14 so that each is on a respective lateral side of the first track 18 at a substantially same lateral distance therefrom; the first and second pickers 30 and 32 being slanted relative to the second axis 16;

first and second lifting shares 34 and 36 mounted to the frame 12, each under and behind a respective one of the first and second pickers 30 and 32 for solidary pivotal movement therewith;

first and second sensors 38 and 40 mounted to the frame 12 and coupled to a respective one of the lifting shares 34 and 36 to generate respective first and second signals indicative of a change of pressure thereon; and a third sensor 42 on the first track 18 to determine a change of pressure thereon and to generate a third signal indicative of the change of traction force; the first track 18 being energized according to the first and second signals so as to match the pressures on the lifting shares 34 and 36.

It is to be noted that the expression 'operatively oriented' is to be construed in the description and in the claims to refer to the orientation of the resulting traction force.

Each of these components of the harvester 10 will now be described in more detail.

It is to be noted that many conventional components of a harvester, which are of less interests to the present disclosure, are not shown in the drawings to alleviate the views or are shown and will not be described herein for concision purposes.

The frame 12 includes a rectangular base 44 that is mounted to the first and second parallel track assemblies 18-20 so as to be supported therefrom. The frame 12 further includes three parallel side mounting structures 46, 48 and 50 that extends generally perpendicular from the base 44 on a same lateral side thereof and parallel to the axis 16. The mounting structures 46-50 are shaped so as to define a pentagon with the base 44.

The three mounting structures 46-50 are distanced to define two positions therebetween for receiving the first and second pickers 30-32 is a parallel relationship. Since carrot and other root vegetable pickers are believed to be well-known in the art, the pickers 30-32 will not be described herein in more detail for concision purposes.

The pickers 30-32 and the lifting shares 34-36 are mounted to the frame 12 on a first lateral side thereof and the three-point hitch mounting assembly 26 is secured to the frame 12 on the other lateral side. The pickers 30-32, lifting shares 34-36 and the three-point hitch assembly 26 all extends on a same side of the frame 12 which defines the front of the harvester 10.

The three-point hitch mounting assembly 26 allows operatively attaching the two-row harvester 10 to a conventional tractor 28. This feature reduces the size and cost of the harvester 10 compared to conventional multi-row harvesters (not shown) which requires an integrated tractor.

Since three-point hitches are believed to be well-known in the art, they will not be described herein in more detail for concision purposes.

The lifting shares 34 and 36 are both in the form of a bar 52, having a plow 55 mounted at its distal end.

Both lifting shares 34-36 are mounted to the base 44 of the frame 12 for pivotal movements via a mounting assembly 56 that allows setting the penetration depth of the lifting shares 34-36 into the soil 54.

Figure 3:
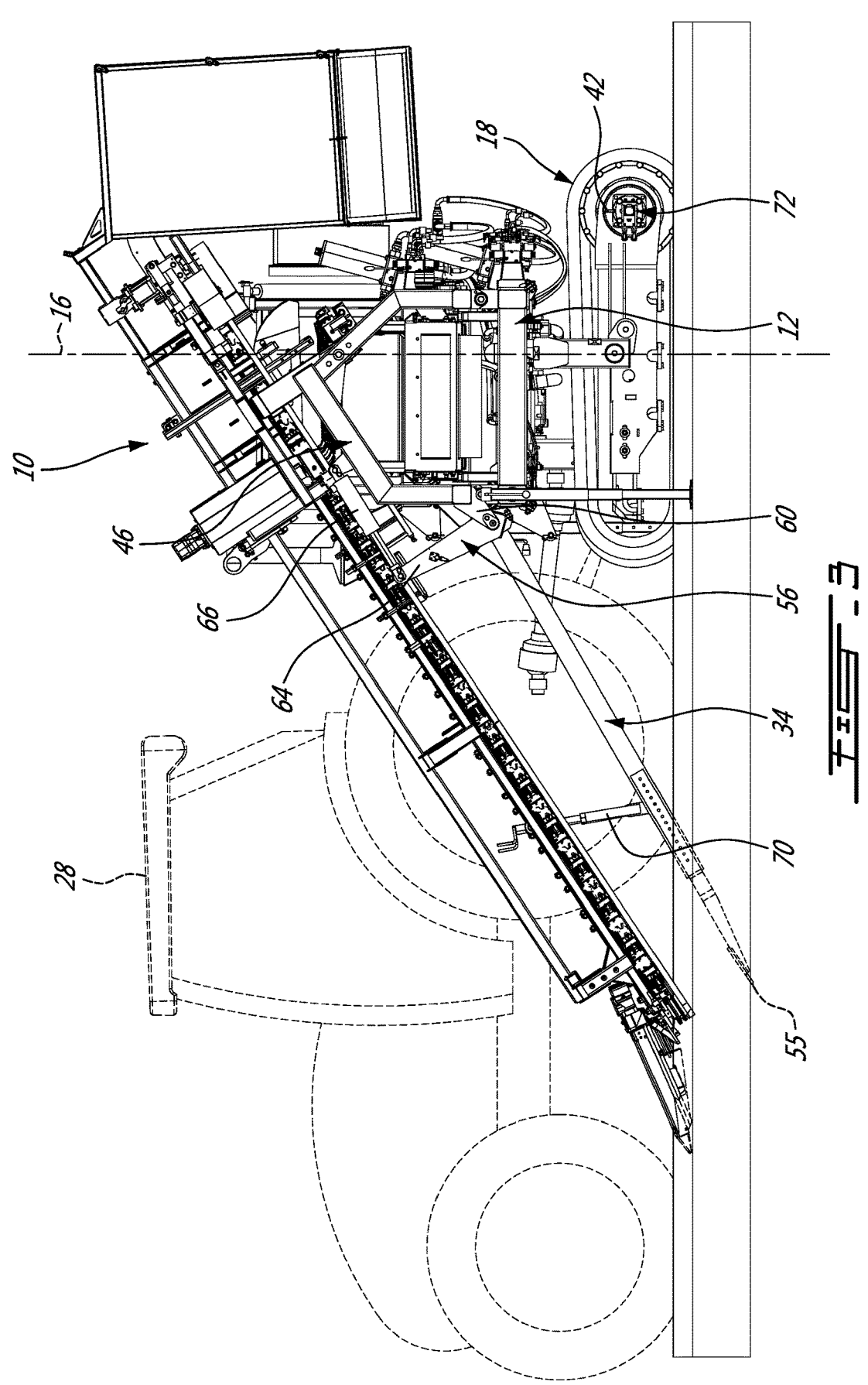
FIG. 3 is a side elevation of the harvester from FIG. 1; the harvester being shown attached behind a conventional tractor

With reference more specifically to FIGS. 1 and 3, the mounting assembly 56 includes a central bar 58 that fixedly receives both lifting shares 34-36 thereon via their proximate end so that each lifting share 34, 36 is operatively registered with a respective picker 30, 32 thereunder.

The central bar 58 is mounted to the frame 12 via lateral brackets 60 for pivotal movement about the axis 62, which is parallel to axis 14.

The mounting assembly 56 further includes two lateral lever arms 64 that are generally perpendicular to the central bar 58. Each lever arm 64 is pivotally mounted to the frame 12 via a cylinder 66 which further acts as an actuator to pivot the lifting shares 34-36 in unison.

A secondary bar 68 is mounted to both the central bar 58 of the mounting assembly and main bar 52 of the lifting shares 34, 36 so as to be parallel thereto, for solidary movement therewith.

The secondary bar 68 adds rigidity to the lifting share 34, 36 and also receives a coupling element, in the form of an adjustment screw 70, that is also attached to a respective picker 30 or 32 for pivotal movement of the pickers 30-32 and lifting shares 34-36 in unison.

In operation, both cylinders 66 are actuated to raise or lower the pickers 30-32 and lifting shares 34-36 in unison. A selected position of the lifting shares 34-36 relative to the ground 54 allows fixing the penetration depth of the lifting shares 34-36 therein. This selected position is fixed by locking the cylinders 66 in the corresponding position.

The first and second sensors 38 and 40 are coupled to a respective cylinder 66 so as to measure a change of pressure thereon and to generate respective first and second signals indicative thereof. In operation, this change of pressure is indicative of a change of friction/pressure into the lifting shares 34-36.

The third sensor 42 includes a pair of pressure sensors that are coupled respectively to the input and output of the motor 72 of the motorized track 18. The sensor 42 measures the difference between the drive input and its output and generates a third signal indicative thereof. In operation, the third signal is also indicative of a change of friction/pressure into the lifting shares 34-36.

In operation, the harvester 10 is mounted onto the tractor 28 via the three-point hitch assembly 26. The cylinders 66 are then moved to a position that corresponds to a desire depth of the distal end 55 of the lifting shares 34-36 into the ground 54. The tractor 28 then pulls the harvester 10 in a direction that aligns the pickers 30-32 with two adjacent rows 74 of carrots while the moving components of the harvester 10 are energized by the power output of the tractor 28 via the three-point connection thereof. The motorized track 18 also contributes to pushing the harvester 10.

The traction force of the motorized track 18 is set taking into account readings from the sensors 38-42 so as to compensate for any additional pressure/friction on the lifting shares 34-36, resulting in the constant alignment of the harvester 10 relative to the rows 74 of carrots during operation The harvester 10 further includes other well-known components such as a conveyor 76 under the pickers 30-32 that receives the carrots (not shown) when they are released from the first and second pickers 30-32, an oil tank 78, etc., which are believed to be well-known in the art and which will not be described herein in more detail for concision purposes.

While the harvester 10 has been described as a two-row harvester, it can be modified for three or more rows. According to such an embodiment, the motorized traction assembly

18 is configured and positioned under the frame so as to compensate for the extra load/friction.

It is to be noted that many modifications could be made to the harvester 10 described hereinabove and illustrated in the appended drawings. For example:

- the frame is not limited to the illustrated embodiment and can take other form allowing to support and relatively position the various components of the harvester 10;
- the pickers 30-32 and/or lifting shares 34-36 may take other form than illustrated;
- in addition to the pickers 30-32 and lifting shares 34-36, the harvester 10 may be equipped with more or less components and may have more or less functionalities than those illustrated;
- one or both tracks 18 and 20 may be replaced by a corresponding wheel (not shown);
- other mechanisms than the cylinders 66 may be provided to position the pickers 30-32 and lifting shares 34-36 relative to the ground 54;
- one of i) the pressure sensors 38-40 on the cylinders 66 and ii) sensor 42 on the motorized track 18 may be omitted;
- other types of sensors than pressure sensors on the cylinders 66 and on the track 18 may be used to measure changes of friction on the lifting shares 34-36 as they move in the ground 54;
- the pressure sensors on the cylinders 66 can be omitted and the forward speed of the motorized track 18 can instead be synchronized with that of the tractor 28.

The harvester 10, and more specifically the pickers 30-32, may be adapted to pick other root vegetables than carrots.

Although a tractor-assisted multi-row harvester for root vegetables has been described hereinabove by way of illustrated embodiments thereof, it can be modified. It is therefore to be understood that numerous modifications may be made to the illustrative embodiments and that the scope of the claims should not be limited by the thereby but should be given the broadest interpretation consistent with the description as a whole.

What is claimed is:

1. A tractor-assisted multi-row harvester for root vegetables comprising:
- a frame having a height and first and second lateral sides defining a width of the frame; the frame further defining a first axis along its width and a second axis along its height;
- the second axis being perpendicular to the first axis;
- first and second parallel traction assemblies that are mounted to the frame thereunder for supporting the frame so as to be both operatively oriented perpendicular to both the first and second axes; the first and second traction assemblies being registered with respectively first and second positions along the first axis near the first and second lateral sides of the frame respectively; the first traction assembly being motorized by a motor mounted thereto;
- a three-point hitch mounting assembly secured to the frame for operatively attaching the multi-row harvester to a tractor;
- a plurality of generally parallel pickers that are pivotally mounted to the frame on a first lateral side of the three-point hitch mounting assembly along the first axis so that at least one of the plurality of generally parallel pickers is at least partially registered with the first traction assembly; the plurality of generally parallel pickers being slanted relative to the second axis;

a plurality of lifting shares mounted to the frame, each under and behind a respective one of the plurality of generally parallel pickers for solidary pivotal movement therewith; and at least one sensor mounted to the frame and coupled to the first traction assembly for generating at least one first signal indicative of a pressure on the plurality of lifting shares;

the first traction assembly being energized according to the at least one first signal to match the pressure on the plurality of lifting shares.

2. The harvester as recited in claim 1, wherein the at least one sensor is mounted to at least one of the plurality of lifting shares so that the at least one first signal is indicative of a pressure directly thereon.

3. The harvester as recited in claim 1, wherein the at least one sensor is mounted to the first traction assembly to measure a change of a traction force thereof.

4. The harvester as recited in claim 1, wherein the at least one sensor includes at least one first sensor mounted to at least one of the plurality of lifting shares so as to generate the at least one first signal and a second sensor mounted to the first traction assembly to measure a change of a traction force thereon and to generate a second signal indicative thereof; the first traction assembly being energized according to both the at least one first signal and the second signal.

5. The harvester as recited in claim 1, wherein at least one of the first and second traction assemblies is an endless track assembly.

6. The harvester as recited in claim 5, wherein the first and second traction assemblies are endless track assemblies.

7. The harvester as recited in claim 1, wherein at least one of the first and second traction assemblies is a motorized wheel.

8. The harvester as recited in claim 1, further comprising a mounting assembly secured to the frame and including a bar that is parallel to the first axis and that fixedly receives the plurality of lifting shares and at least two lever arms, each having a first longitudinal end that is fixedly mounted to the bar so as to extend perpendicularly thereto and pivotably mounted to the frame, and a second longitudinal end that is pivotably mounted to the frame via a cylinder; the cylinders further acting as actuators to pivot the lifting shares in unison relative to the frame.

9. The harvester as recited in claim 8, wherein the at least one sensor is mounted to one of the cylinders so as to measure a change of pressure thereon.

10. A tractor-assisted two-row harvester for root vegetables comprising:

a frame having a height and first and second lateral sides defining a width of the frame; the frame further defining a first axis along its width and a second axis along its height; the second axis being perpendicular to the first axis;

first and second parallel traction assemblies that are mounted to the frame thereunder for supporting the frame so as to be both operatively oriented perpendicular to both the first and second axes; the first and second traction assemblies being registered with respectively first and second positions along the first axis near the first and second lateral sides of the frame respectively; the first traction assembly being motorized by a motor mounted thereto;

a three-point hitch mounting assembly secured to the frame for operatively attaching the two-row harvester to a tractor;

first and second generally parallel pickers that are pivotally mounted to the frame on a first lateral side of the three-point hitch mounting assembly along the first axis; the first and second generally parallel pickers being on respective lateral sides of the first traction assembly; the first and second pickers being slanted relative to the second axis;

first and second lifting shares mounted to the frame, each under and behind a respective one of the first and second pickers for solidary pivotal movement therewith; and at least one sensor mounted to the frame and coupled to the first traction assembly for generating at least one signal indicative of a pressure on the first and second lifting shares; the first traction assembly being energized according to the at least one signal so as to match the pressure on the first and second lifting shares.

* * * * *